United States Patent [19]
Loper

[11] Patent Number: 6,039,083
[45] Date of Patent: Mar. 21, 2000

[54] VENTED, LAYERED-WALL DEEPWATER CONDUIT AND METHOD

[75] Inventor: Cobie W. Loper, Kingwood, Tex.

[73] Assignee: Wellstream, Inc., Panama City, Fla.

[21] Appl. No.: 09/170,668

[22] Filed: Oct. 13, 1998

[51] Int. Cl.$^7$ ............................... F16L 11/00; F16L 3/00
[52] U.S. Cl. ........................ 138/135; 138/107; 138/125
[58] Field of Search ................................ 62/55; 138/107, 138/112, 114, 125, 126, 104; 285/114, 39

[56] References Cited

U.S. PATENT DOCUMENTS

| | | | |
|---|---|---|---|
| 4,315,408 | 2/1982 | Karl | 62/55 |
| 4,343,333 | 8/1982 | Keister | 138/125 |
| 4,411,456 | 10/1983 | Martin | 285/39 |
| 4,470,621 | 9/1984 | Irvine | 285/114 |
| 4,509,558 | 4/1985 | Slater | 138/104 |
| 5,052,444 | 10/1991 | Messerly et al. | 138/125 |
| 5,488,975 | 2/1996 | Chiles et al. | 138/125 |
| 5,647,400 | 7/1997 | Jani et al. | 138/126 |

*Primary Examiner*—Andres Kashnikow
*Assistant Examiner*—David Hwu
*Attorney, Agent, or Firm*—Browning Bushman

[57] ABSTRACT

A flexible conduit constructed of overlapping layers of sealing and strengthening materials designed to resist tensile, compressive, and axial forces is employed as a submerged flow line carrying pressurized fluid. Sealing material layers disposed radially on either side of the strengthening layers isolate the strengthening layers from the liquids that contact the internal and external conduit walls. The innermost seal layer is positioned within a burst layer that protects the external strengthening layers from pressure-induced damage. The annular area between the strengthening layers is continuously vented to the atmosphere to prevent pressure damage to the strengthening layers caused by gases leaking or permeating into the annular area through the seal layers. End connectors join sections of the conduit together and connect the vents of the sections to each other to form a continuous vent passage that vents the annulus gas at the water surface.

25 Claims, 4 Drawing Sheets

VENTED, LAYERED-WALL DEEPWATER CONDUIT AND METHOD

BACKGROUND OF THE INVENTION

1. Field of the Invention

The present invention relates to conduits and their methods of manufacture and use in the conveyance of fluids and gases. More particularly, the present invention relates to flexible conduits that are submergible in deep water to be employed to convey high pressure fluids with provision for venting high pressure gases trapped in the layers forming the conduit wall.

2. Description of the Prior Art

Flexible conduits are commonly employed to convey liquids and gases between submerged pipelines and offshore oil and gas production facilities and other installations. These conduits are subjected to high internal and external pressures, as well as chemical actions associated with the seawater surrounding the submerged conduits and the fluids being transported within the conduits.

The conduits are customarily constructed of axially extending, overlapping tubular layers of strengthening and sealing materials that are individually designed to provide specific structural and barrier protection against the pressure force and chemical hazards encountered in the conduit use. Typical conduit construction includes a helically wound metal band with adjacent bands interlocked that provides protection against external hydrostatic pressure and radial burst forces acting from within the conduit. Additional strengthening layers of flat wire bands or stranded materials and other materials with high tensile strength are wound in alternating layers about the metal band layer to provide further burst strength and to increase the axial strength of the conduit. Elastomeric layers of polymetric material are extruded over the wound layers at appropriate intervals to provide a sealing layer or barrier seal for preventing radial fluid and pressure migration through the conduit wall.

Entry of gas between the sealing layers of the conduit wall can lead to damage in these multilayered conduits. The danger of such damage becomes particularly likely where the conduit is used to convey high pressure fluids or gases in deep water. High pressure gas in the conveyed fluid can permeate through a sealing layer of the elastomeric material and become trapped between radially spaced sealing layers of the conduit. Gas trapped between the walls of the conduit expands when the external pressure on the conduit is lowered, as, for example, when the submerged conduit is raised to the water surface or when the internal bore pressure is lowered, as, for example, when the conduit is shut in. Where a sealing layer is interposed between trapped gas and strengthening material of limited burst or collapse resistance, a pressure differential across the sealing layer caused by the expanding trapped gas can produce radial forces sufficient to rupture, collapse, or otherwise damage the strengthening materials.

The problem of expanding gases in flexible conduits is primarily limited to applications where the conduit is submerged in relatively deep water and is employed to transport high pressure gases or fluids containing dissolved gases. Such situations exist with many oil and gas operations offshore. The problem is not present when the conveyed fluid is a liquid that is free of any dissolved gas.

One attempt to address the problem of trapped gas in the layers of flexible piping has been to simply increase the strength of the strengthening and sealing layers to withstand the maximum possible pressure differential that may occur from the trapped gases. The solution is expensive, and the more resistant the conduit is made to the pressure differentials, the larger and stiffer the conduit becomes.

The annulus between sealing layers in the end segment of a submerged conduit line is commonly vented through the riser pipe to the water surface. Longer lengths of conduits that are joined in sections vent the trapped gas in the submerged sections directly into the water adjacent the connector. The trapped gas is vented through a one-way valve into the surrounding water. A problem with the systems of this type is that the gas vents at the hydrostatic pressure of the water into which it vents. In deep water, the pressure may be substantial. Moreover, failure of the valve to properly vent the trapped gas as the conduit is retrieved to the surface allows the gas to expand and damage the conduit when the conduit is retrieved to the water surface or build compressive forces sufficient to collapse the conduits underlying layers when the conduit bore pressure is lowered. Such valve failures are difficult to prevent in applications where the valve is exposed to the harsh sea bottom environment for long periods of time. Proper operation of the valve is also difficult to test when the conduit is submerged.

SUMMARY OF THE INVENTION

The flexible conduit of the present invention may be employed in deep water for conveying high pressure liquids or gases with significantly reduced danger of trapping gases in the layers of the conduit wall. The conduit is made safe from the effects of trapped gases without resort to heavy and expensive construction materials and without need for a large, bulky, and stiff conduit body.

Gas trapped between sealing layers of the conduit wall is vented above the water surface through a continuous vent passage that extends through end connectors securing adjoining sections of the conduit to each other.

The conduit wall of the present invention is made using internal sealing barrier layers disposed internally of the burst-resistant layer and externally of the outer strengthening layers of the conduit wall, thereby isolating the strengthening material layers from the forces induced by the differential pressure effects of the trapped gases. The vented annular area defined between the external sealing layers and the internal sealing layers contains the strengthening layers and isolates them from the conveyed fluid within the conduit and the seawater externally of the conduit.

In use, the flexible conduit is submerged in deep water and is used to convey high pressure gas or liquids with dissolved gases. Gas that permeates the sealing layers of the conduit walls is vented to the water surface through a continuous vent passage to prevent damage to the conduit walls. The end connectors used to secure segments of the conduit together provide mechanical and sealing engagement with the conduit layers of each section and also provide a vent passage between segments without the need for special circumferential orientation of the connectors.

From the foregoing, it will be appreciated that a primary object of the present invention is to provide a submergible, flexible conduit construction that prevents the accumulation of pressurized gas between overlapping layers of a multilayer conduit wall by venting such gas to the water surface through a continuous vent passage in the conduit wall.

It is also an object of the present invention to provide a flexible conduit that resists collapse in deep water by preventing accumulation of gas between layers of the conduit wall so that the collapse-resistant layers of the conduit wall may combine to resist collapse when the pressure of the fluid in the bore of the conduit is reduced.

Yet another object of the present invention is to provide a flexible, submergible fluid conduit that may be moved between environments of high external pressure and environments of relatively low external pressure without danger of producing damage to the conduit from the effects of expanding gases trapped within the layers of the conduit wall.

Yet another object of the present invention is to provide a flexible, multilayer conduit constructed of multiple end-connected sections and having provision for the continuous passage of interlayer gas from one section of the conduit to an adjoining section whereby gas entering the annular area between sealed sections of the conduit wall is permitted to flow to the end of the conduit.

It is also an important object of the present invention to provide sections of a flexible conduit with end connectors for assembling such sections together to form an elongate conduit with such connectors having seals that engage and seal with separate overlapping barrier layers of the conduit section walls and wherein such connectors communicate a vent passage of one section of the conduit through the connector assembly to a vent passage of an adjoining section.

A related object of the present invention to provide a conduit having a connector of the type described wherein the venting passages of the adjoining connectors may be communicated together without regard to the circumferential alignment of the adjoining connectors.

It is a general object of the present invention to provide a submergible, flexible conduit having a multi layer wall construction that may be employed in deep water for the conveyance of high pressure liquids and gases and that is constructed of conventional flexible conduit materials having dimensions consistent with conduits employed in shallower water without resort to the use of heavy, bulky, or stiffening constructions.

The foregoing, as well as other, objects, features, and advantages of the present invention will be more fully understood and appreciated by reference to the following drawings, specification, and claims.

DESCRIPTION OF THE ILLUSTRATION EMBODIMENTS

Figure 1:
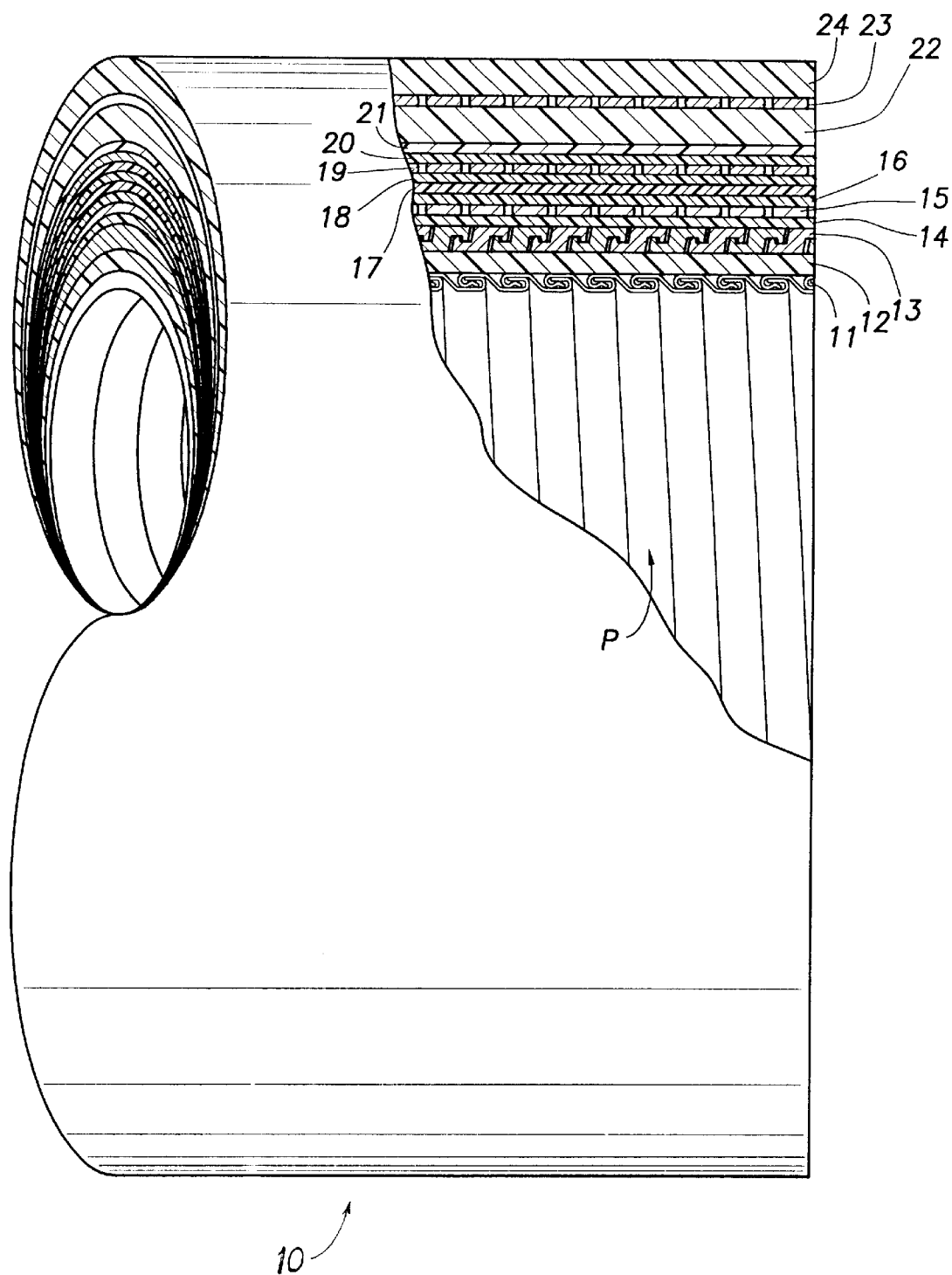
FIG. 1 is an elevation, partially in section, illustrating a conduit body wall constructed in accordance with the teachings of the present invention.

FIG. 1 illustrates the wall construction of a multilayer flexible conduit, indicated generally at 10, made in accordance with the teachings of the present invention. The central flow passage P for the conduit 10 is provided by a flexible, corrugated metallic tube 11 fabricated from a preform metallic strip that is wound with the adjacent edges of the strip interlocked. The flexible body 11, referred to as a carcass, supports the overlying layers of the conduit and prevents collapse from external water pressures or permeated gas buildup pressures or from other pressure or crushing loads applied during the conduit operation. The carcass is not fluid-tight and is usually immersed in the conveyed fluid. The carcass 11 may be made of materials such as carbon steel, stainless steel, and other alloys specifically designed to withstand corrosion and erosion in a specific application. A tubular, polymer fluid barrier 12 is extruded over the carcass 11 to form a radial sealing boundary for the conveyed fluid in the passage P. The material of the barrier layer 12 is also selected to be chemically and thermally resistant to the conveyed fluid and to withstand anticipated service conditions.

A helically wound, steel, Z-profile hoop-strength layer 13 overlies the sealing barrier 12. The material of the layer 13 is a circumferentially wound, profiled wire with the edges of the wire interlocking as they are wound. The layer 13 resists the radial burst forces induced by the pressurized fluids contained in the passage P acting radially against the pressure-sealing barrier layer 12 and also resists the collapse forces induced by the pressure of the water surrounding the conduit 10.

A polymer tape layer 14 is applied over the outer layer of the hoop-strength layer 13 to provide a firm base for an overlaying strengthening layer 15 constructed of helically wound steel wire having a rectangular cross-section. The layer 15 also provides increased resistance to the internal burst forces acting in the conduit wall.

The layer 15 is overlaid with another strengthening layer 16, which is a helical steel armor that resists both internal pressure and axial tension in the conduit 10. A polymer tape layer 17 overlies the steel layer 16 to provide a firm base for an overlying strengthening layer 18 of another helically wound steel armor layer. The armor layer 18 is overlaid with a wound, polymer tape layer 19 that provides the base for an overlying helical steel armor winding layer 20. The layer 20 is overlaid with a wound band of polymer tape 21 that forms the base for an overlying external polymer barrier seal layer 22. An intermediate layer of steel tape 23, with a rectangular cross-section, is wound above the barrier 22 and below another external polymer layer 24. The barrier seal layers 22 and 24 cooperate to resist the intrusion of seawater radially through the wall of the conduit. The intermediate steel winding layer 23 shields the layer 22 from external mechanical damage.

Figure 2:
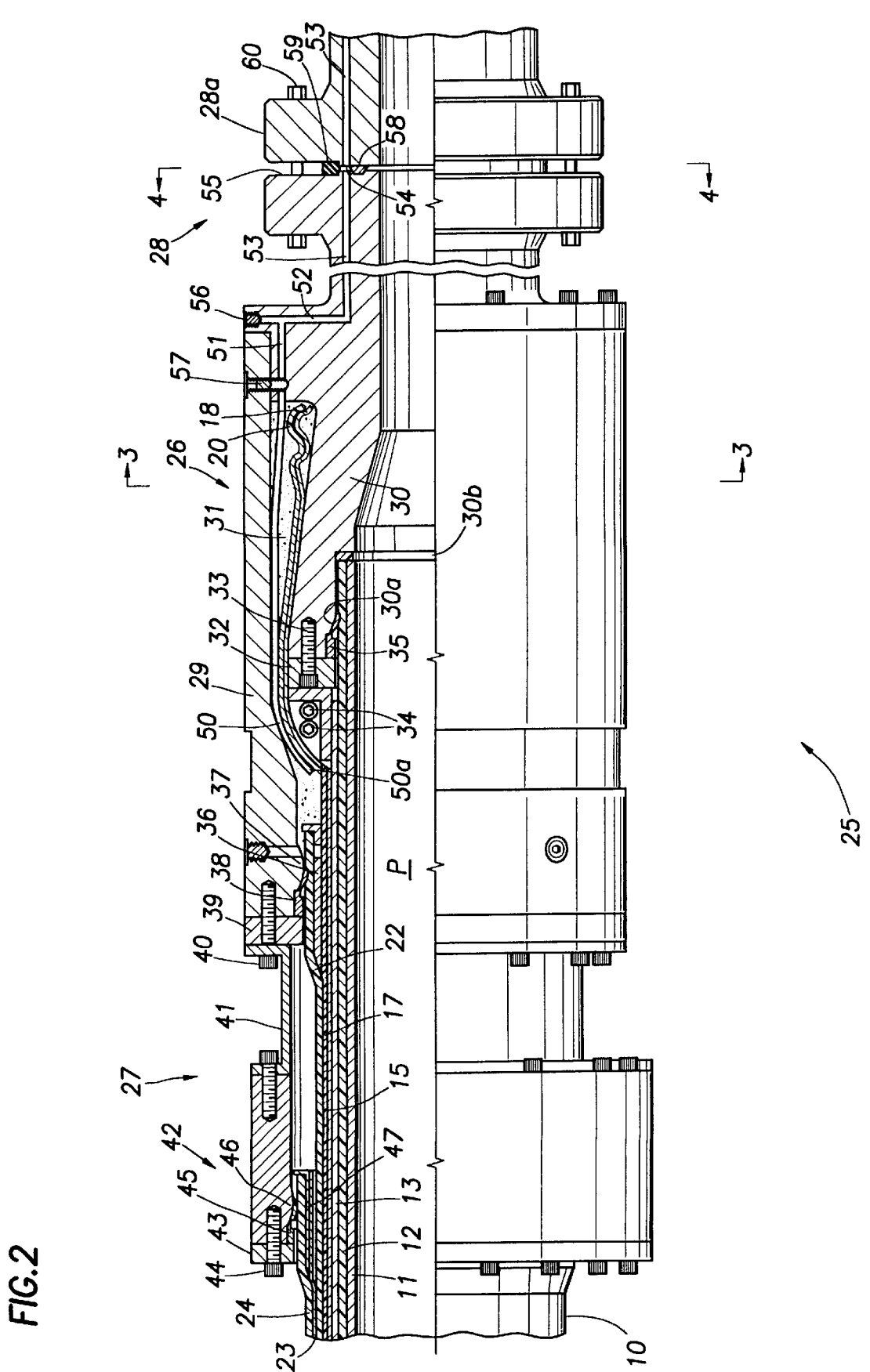
FIG. 2 is an elevation, partially in section, illustrating an intermediate end connector employed with the conduit of the present invention for securing adjoining sections of the conduit together and for providing a continuous vent passage for gas trapped within the layers of the conduit wall.

FIG. 2 of the drawings illustrates an end fitting assembly indicated generally at 25, employed to connect adjoining sections of the conduit 10 to each other. Each section of conduit 10 is provided with two end fitting assemblies 25, one at each of its ends. The end assembly of each section engages a similar end fitting in an adjoining section to form an elongate conduit of the desired length. Each section of the hose is typically deployed from reels as it is laid in the water. A typical reel of 10" diameter conduit (not illustrated) may hold a section of approximately 1000 meters of conduit. A 10 km conduit would be made up in ten sections having twenty end connector assemblies similar to the assembly 25.

The assembly 25 includes a main body end fitting, indicated generally at 26, that is mechanically anchored to, and sealed with, one section of the conduit 10. A transition section indicated generally at 27 is secured to the end of the fitting 26 to anchor and seal the outermost barrier seal layer 24 of the hose 10. The opposite end of the end fitting assembly 25 is equipped with a flange section indicated generally at 28 that is employed to complete the connection with a flange 28a of an adjoining hose section.

Figure 3:
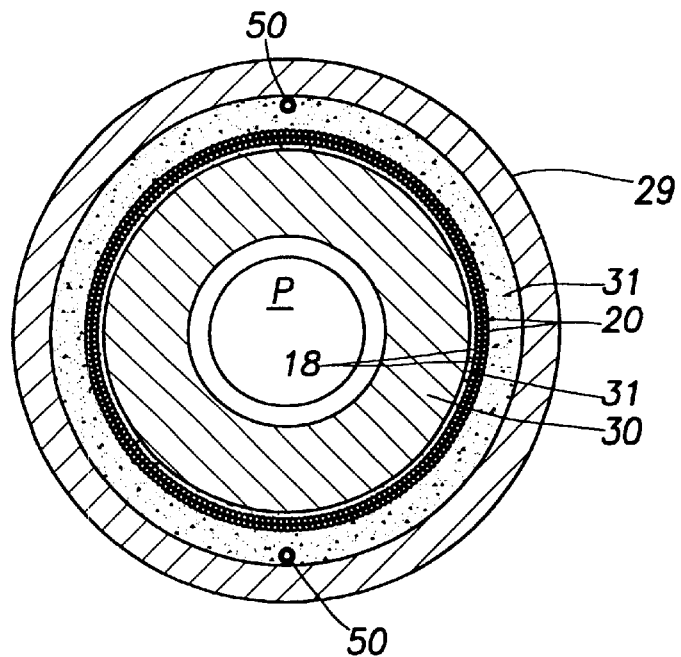
FIG. 3 is a cross-sectional view taken along the line 3—3 of FIG. 2.

With reference jointly to FIGS. 2 and 3, the end fitting assembly 25 employs a tubular outer body sleeve 29 extending over a central tubular termination mandrel 30 integrally connected with the flange section 28. A portion of the external circumferential surface of the termination mandrel 30 is recessed to receive the terminal portions of the helically wound steel armor layers 18 and 20, which are set in an epoxy cement 31.

An annular seal keeper 32 formed of multiple, arcuate segments is secured to the base of the mandrel 30 by bolts 33. The seal keeper 32 is compressed circumferentially about the Z-profile metallic hoop-strength layer 13, the polymer fluid barrier 12, and the metallic carcass 11 by bolts 34 that draw the arcuate keeper segments circumferentially together. The annular seal keeper 32 retains a seal ring 35 axially within a conical seat 30a formed within the base of the mandrel 30. The keeper ring forces the seal 35 between the mandrel seat 30a and the polymer fluid barrier 12 to prevent passage of fluids from the central conduit area within the carcass 11 back into the intermediate area between layers of the conduit 10. A Teflon ring 30b at the end of the metal carcass 11 prevents contact of the metal carcass with the metal mandrel 30 to prevent electrolysis between the two components. Additional details in the construction and operation of the keeper assembly 32 and its arcuate configuration, as well as other details relevant to the construction and operations of the connector 25, may be seen by reference to U.S. patent application Ser. No. 08/729,584, filed Oct. 11, 1996, and assigned to the assignee of the present application.

The end of the external polymer layer 22 is terminated within the tubular outer body sleeve 29, where it is disposed between a central metal spacing sleeve 36 and a radially restricted internal seal area 37. A seal ring 38 is forced axially into sealing engagement between the seal area 37 and the external surface of the polymer layer 22 to isolate the annular area between the two polymer layers 22 and 24. The seal ring 38 is held in place by an end ring 39 secured to the end of the tubular sleeve body 29 by bolts 40. The construction and operation of the seal ring 38 within the end connector 25 is detailed in the previously identified U.S. patent application Ser. No. 08/729,584 and is also described in U.S. Pat. No. 5,639,128, assigned to the assignee of the present application.

The bolts 40 secure an annular transition piece 41 to the end of the sleeve 29. The transition piece 41 connects to an annular terminal seal assembly, indicated generally at 42, used to secure and seal the outermost layer 24 of the external polymer layers to the end connector assembly 25. An end seal ring keeper 43 held to the axial end of the seal assembly 42 by bolts 44 retains a seal ring 45 in place over the external polymer layer 24 below an internal radially restricted sealing area 46 formed within the seal system body 42. An annular metal spacer sleeve 47 positioned within the end of the sleeve 24 cooperates with the seal ring 45 to prevent leakage across the sealed area. The seal ring 45 functions in a manner similar to that described with regard to the seal rings 38 and 35 to prevent fluid leakage past the sealing point. In each construction, the surrounding outer constraining components of the structures connected with the end rings 43, 39, and 32 operate to provide axial constraint and radial compression against respective seal rings to form seals with the underlying conduit layer.

Gases trapped between the sealing layers of the conduit 10 are vented to the ends of the conduit. To this end, the annular area between the polymer layer 22 and the inner polymer fluid barrier 12 defines a conduit portion of a vent passage that communicates with a connector portion of a vent passage. The connector vent passage is formed by the open end 50a of a vent tube 50 extending through the epoxy cement 31 to an axial passage 51 to a radial passage 52 and to a second axial passage 53, where it communicates with a circumferential groove 54 formed within the base 55 of the flange 28. The vent tube 50 may be of either thermoplastic or steel mortised construction.

Figure 4:
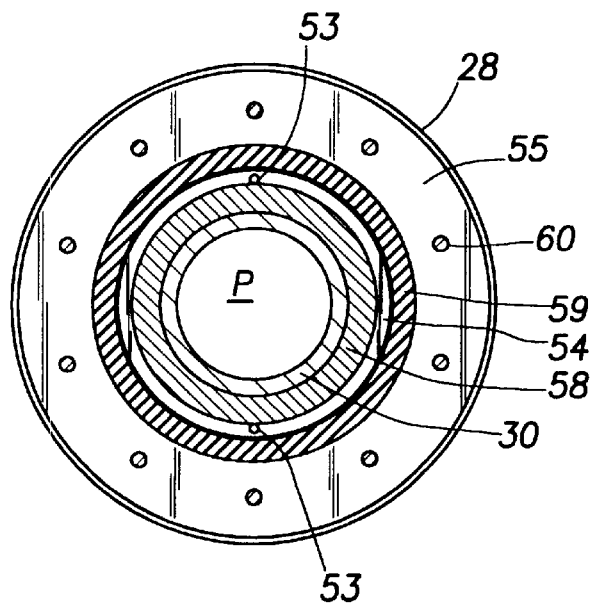
FIG. 4 is a cross-sectional view taken along the line 4—4 of FIG. 2 illustrating a flange end view of the connector of the present invention.

As best seen by joint reference to FIGS. 2 and 4, the circumferential flange groove 54 is sealed between an inner O-ring seal 58 and an outer O-ring seal 59. The seals 58 and 59, which are constructed of stainless steel or other suitable materials, are compressed axially between abutting flanges 28 and 28a on adjacent conduit segments. Bolts 60 are employed to hold the flanges 28 and 28a together.

The vent passage through the connector 25 for conducting gas from the annular area between the outer seal barrier layers 22 and 24 and the inner seal barrier layer 12 begins at the end opening 50a of the vent tube 50 and extends through the tube 50 past the open test plug 57, to the mandrel bores 51, 52, 53, to the circumferential flange face groove 54. Two or more such vent passages may be formed through each connector assembly 25 with each passage communicating with the annular groove 54. The groove 54 serves the dual function of communicating vent passages within a single conductor and also permits the vent passages in adjoining connectors to communicate without regard to the circumferential placement of the vent passages, thus eliminating the requirement to align vent passages in adjoining connectors.

The vent passage connector between adjacent end connectors is adapted for testing to confirm proper engagement and sealing of the vent connections between adjacent conduit segments. For this purpose, a test plug 56 capping the end of the radial bore 52 is removed, and a pressurized fluid is supplied to the vent passage. Blanking plug 57 is provided for temporarily blocking the vent tube 50 during the testing. When a test is to be conducted, the plug 57 is screwed down to block the vent passage.

Figure 5:
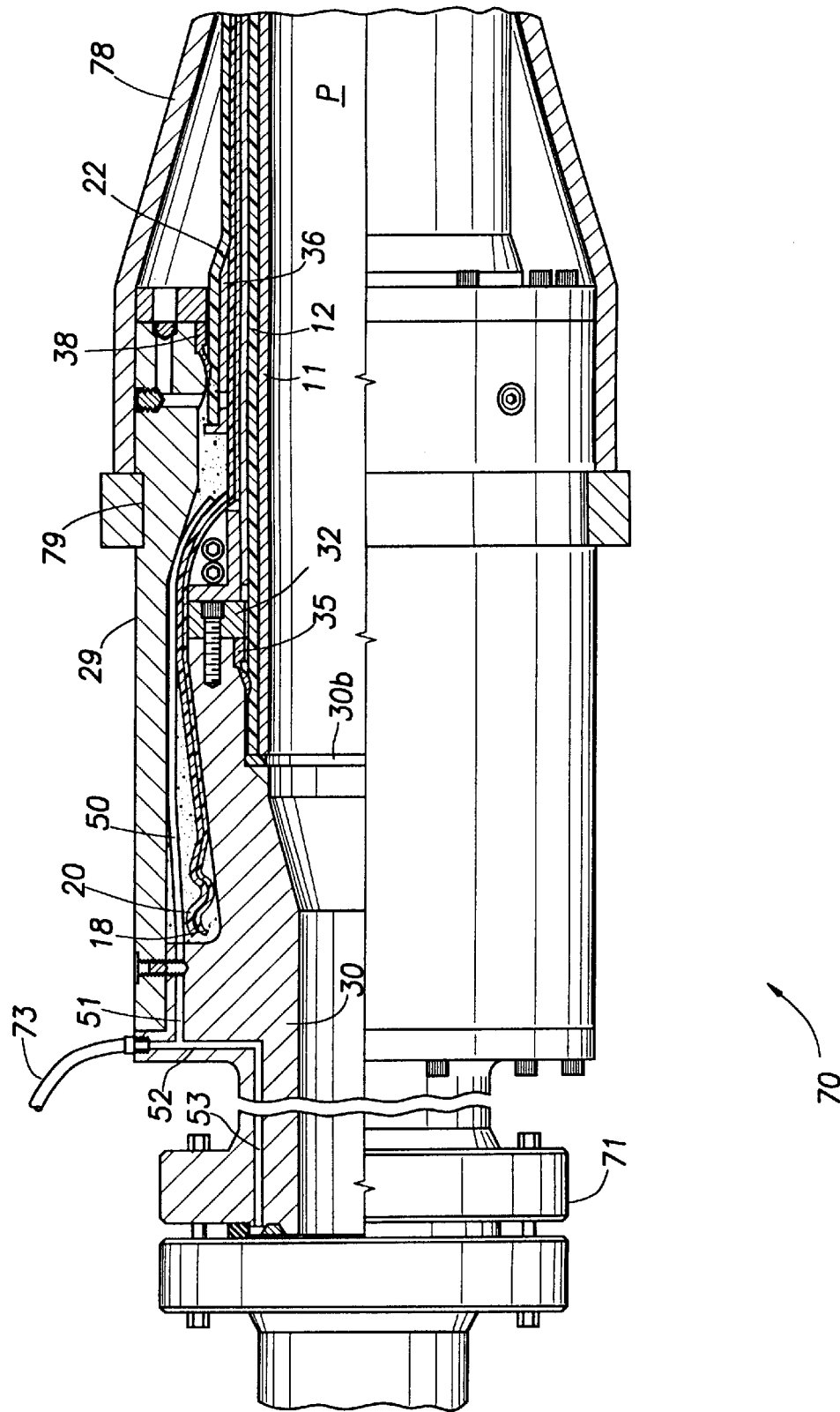
FIG. 5 is an elevation, partially in section, illustrating a facilities terminal connector at one extreme end of the conduit of the present invention

With reference to FIG. 5, a terminal end connector of the conduit 10 is illustrated generally at 70. The connector 70 is employed to secure the conduit 10 to a rigid riser pipe (not illustrated) of an offshore production facility or to a subsea installation or to another facility to which the conduit is to be used to convey fluids. A flange 71 at the end of the terminal connector assembly 70 may be employed to secure the end of the conduit 10 to a matching flange (not illustrated) that communicates with the facilities flow conduit to which the conduit 10 is attached. The terminal end connector 70 is similar to the intermediate end connector 25 illustrated in FIGS. 1 and 2 and certain similar components are identified by the same reference characters.

Gas carried in the vent tube 50 of the connector 70 communicates through the bore 51 into an exhaust vent line 73 that conveys the gas to a remote flare or other processing facility (not illustrated). The face of the flange 71 is similar to the face 55 of the flange 28 and includes an annular communication groove 54 that is isolated between radially spaced metallic O-ring seals (not illustrated) when the flange is connected to the facilities flange. The annular flow path of the groove 54 in the flange 71 communicates with the gas from the multiple vent lines 50 to convey the gas from each line to the exhaust vent line 73.

A bend stiffener 78 secured to a recess 79 in the body 29 of the terminal end connector 70 extends over the external body of the conduit 10 to provide a mechanical reinforcing transition between the solidly anchored end connector 70 and the flexible conduit 10.

In assembling an elongate conduit 10 of the present invention, the intermediate connector end assemblies 25 are joined together at the ends of adjoining sections of the conduit 10. Each of the flange components 28 mates with a similar flange component 28a on each joined conduit section. Bolts 60 are employed to secure the flanges 28 and 28a together to maintain mechanical connection and to compress the O-ring seals 58 and 59. Once two end connectors 25 have been secured, the connection may be tested for leakage of the vent passages. The blanking plugs 57 in the adjoining connector assemblies are closed and a test plug 56 in one of the assemblies is removed. It will be understood that multiple flow passages 51 may extend through each connector and that all of the flow passages are closed by a blanking plug 57 during the test. A high pressure gas is applied through the test plug port to the interconnecting flow passages 51, 52, 53, annular groove 54, and the connecting components in the adjoining end connector to test for leakage. After completion of a successful test, the test plug 56 is replaced, and the blanking plugs 57 are opened to reestablish the vent passage across the joined connectors.

A terminal end connector 70 at each end of the assembled conduit is connected to a surface or underwater facility between which fluids are to be conveyed. The end connector 70 is secured to a flange fitting on the facility that mates with the flange 71 to provide a mechanical, leakproof connection between the facility and the conduit end. Where the connection of the connector 70 is being made at a submerged location, the connection for the vent exhaust line 73 is plugged. Where the end connection is being made at a surface facility, the exhaust vent line 73 is employed to transport gases in the vent passage of the conduit 10 to a remote location for burning or other processing.

The foregoing description and examples illustrate selected embodiments of the present invention. In light thereof, variations and modifications will be suggested to one skilled in the art, all of which are in the spirit and purview of this invention.

What is claimed is:

1. A flexible conduit with a central flow passage adapted to be submerged in a body of water for conveying high pressure fluids through the body of water, comprising:

an axially extending conduit wall constructed of multiple, radially spaced layers of differing material;

radially inner and radially outer sealing material layers included in said wall for preventing radial fluid flow through said conduit wall;

a vent passage disposed in the annulus between said inner and outer sealing layers for conveying fluids axially through said annulus;

an exhaust vent communicating with said vent passage for conveying fluid in said vent passage to a pressure area having a lower pressure than the pressure exerted on said conduit by the body of water within which said conduit is submerged;

multiple tubular segments of said conduit wall adapted to be connected together to form an elongate, segmented conduit;

end connectors at each end of said multiple tubular segments for securing and sealing adjoining segments together: and communication passages extending through said end connectors for joining vent passages in adjoining segments.

2. A conduit as defined in claim 1 wherein strengthening material layers are provided in said wall between said inner and outer sealing material layers.

3. A conduit as defined in claim 2 wherein a burst-resistant layer is disposed in said wall intermediate said inner sealing material layer and said strengthening material layers.

4. A conduit as defined in claim 2 wherein a collapse-resistant layer is disposed in said wall intermediate said inner sealing material layer and said central flow passage of said conduit and said pressure area comprises the area above the surface of said body of water.

5. A conduit as defined in claim 1 wherein said communication passages comprise an annular flow passage for communicating adjoining vent passages in said tubular sections without regard to the relative circumferential orientation of adjoining connectors.

6. A conduit as defined in claim 1 wherein strengthening material layers are provided in said wall between said inner and outer sealing material layers.

7. A conduit as defined in claim 6 wherein a burst-resistant layer is disposed in said wall intermediate said inner sealing material layer and said strengthening layers.

8. A conduit as defined in claim 5 wherein a burst-resistant layer is disposed in said wall intermediate said inner sealing material layer and said strengthening layers.

9. A conduit as defined in claim 7 wherein a collapse-resistant layer is disposed in said wall intermediate said inner sealing material layer and said central flow passage of said conduit and said pressure area comprises the area above the surface of said body of water.

10. A conduit as defined in claim 8 wherein a collapse-resistant layer is disposed in said wall intermediate said inner sealing material layer and said central flow passage of said conduit and said pressure area comprises the area above the surface of said body of water.

11. A method of limiting interlayer pressure differentials in a flexible, submerged conduit having connected segments of a multilayer wall construction defining a central flow passage comprising the step of conducting gas in an annular area between radially inner and radially outer sealing material layers of said wall from end to end through conduit segments to a pressure area having a pressure below that of the pressure exerted on said conduit by the fluid within which said conduit is submerged wherein said conduit is constructed of multiple tubular segments connected end-to-end by end connectors and wherein said gas is conveyed through communicating passages extending through said end connectors whereby said gas in annular areas within adjoining tubular segments is communicated through said conduit to said pressure area.

12. A method as defined in claim 11, further comprising the step of placing strengthening material layers radially intermediate said radially inner and said radially outer sealing material layers whereby said wall is strengthened against axial and radial forces acting on said wall.

13. A method as defined in claim 12, comprising the further step of placing a layer of burst strength material radially intermediate said radially inner material layer and said strengthening material layers whereby said strengthening material layers are protected against pressure-induced burst forces acting through said inner sealing material layer.

14. A method as defined in claim 11 wherein said gas enters said annular area from said central flow passage by permeating radially through said inner sealing material layer.

15. A method as defined in claim 11, comprising the further step of placing a collapse-resistant layer radially intermediate said inner material layer and said central flow passage.

16. A method as defined in claim 15, comprising the further step of placing a collapse-resistant layer intermediate said inner and outer sealing material layers.

17. A method as defined in claim 11 wherein said pressure area is the area above the surface of a body of water within which said conduit is submerged.

18. A submergible, flexible conduit for conveying fluids through a body of water, comprising:

an elongate, tubular conduit constructed of multiple adjoining conduit sections, said sections each comprising an axially extending tubular conduit having a wall constructed of radially spaced material layers, including radially inner and outer sealing material layers, said sealing layers defining an annular vent passage for axially conveying fluids contained between said inner and outer layers toward the axial ends of said section;

end connectors securing adjoining conduit sections together; and end connector passages connecting annular vent passages in adjoining conduit sections together whereby fluids in said vent passages may flow between connected conduit sections.

19. A conduit as defined in claim 18, further comprising an exhaust vent passage connecting said annular vent passages to a point above the surface of said body of water whereby fluid in said annular vent passages may be vented at a pressure below that of the pressure within said body of water.

20. A flexible conduit as defined in claim 18 wherein said radially spaced material layers further comprise one or more radially outer sealing material layers surrounding one or more helically wound metallic bands.

21. A conduit as defined in claim 18 wherein said radially spaced material layers include a first outermost sealing material layer disposed over a second sealing material layer and wherein said first and second sealing material layers are separately sealed to an end connector.

22. A conduit as defined in claim 19 wherein said radially spaced material layers further comprise one or more radially outer sealing material layers surrounding one or more helically wound metallic bands.

23. A conduit as defined in claim 18 wherein said radially spaced material layers further comprise a helically wound metallic collapse pressure layer surrounded by a sealing material layer that is sealed to the end connectors.

24. A conduit as defined in claim 22 wherein said radially spaced material layers include a first outermost sealing material layer disposed over a helically wound metallic layer that in turn is disposed over a second sealing material layer and wherein said first and second sealing material layers are separately sealed to an end connector.

25. A conduit as defined in claim 18 wherein said radially spaced material layers include a helically wound metallic burst pressure layer that is separately connected to said end connectors and two or more sealing material layers overlying said burst pressure layer comprising the outer layers of said conduit.

* * * * *